A. O. RUNNING.
PNEUMATIC TIRE CALIPERS.
APPLICATION FILED SEPT. 20, 1916.
1,238,440.
Patented Aug. 28, 1917.
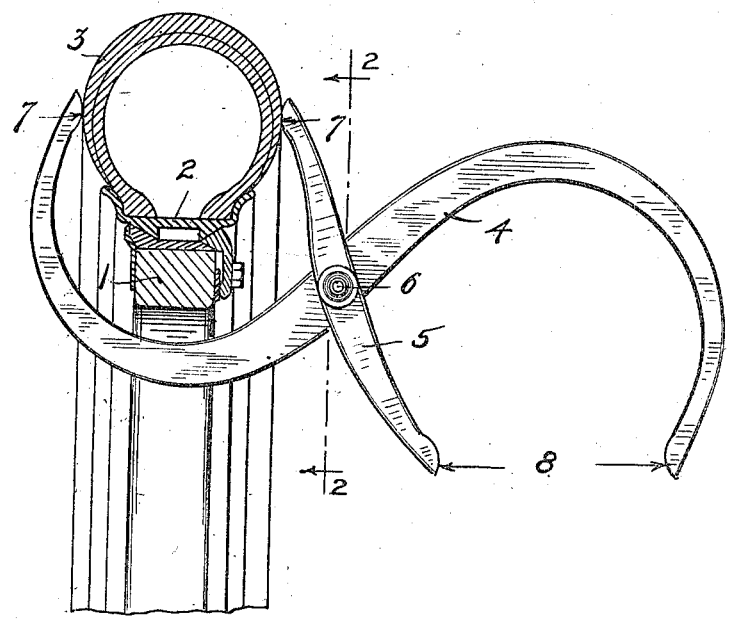
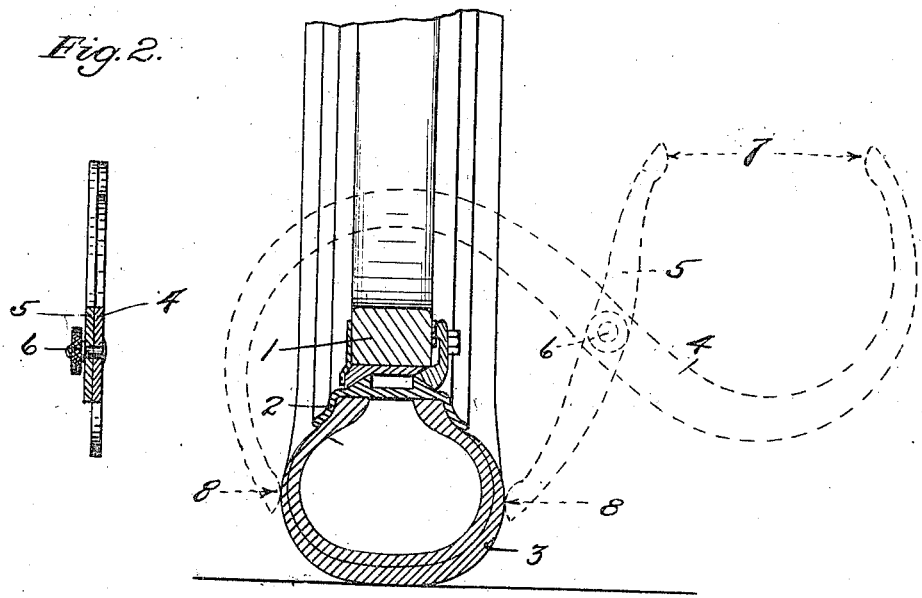
Witnesses
H. L. Opsahl.
E. C. Wills
Inventor
Albert O. Running
By his Attorneys
Williamson Merchant

UNITED STATES PATENT OFFICE.

ALBERT O. RUNNING, OF HAWKINS, WISCONSIN.

PNEUMATIC-TIRE CALIPERS.

1,238,440.  Specification of Letters Patent.  Patented Aug. 28, 1917.

Application filed September 20, 1916. Serial No. 121,162.

*To all whom it may concern:*

Be it known that I, ALBERT O. RUNNING, a citizen of the United States, residing at Hawkins, in the county of Rusk and State of Wisconsin, have invented certain new and useful Improvements in Pneumatic-Tire Calipers; and I do hereby declare the following to be a full, clear, and exact description of the invention, such as will enable others skilled in the art to which it appertains to make and use the same.

My invention relates to improvements in pneumatic tire calipers adapted for use in determining the proper inflation of a pneumatic tire; and, to this end, it consists of the novel devices and combinations of devices hereinafter described and defined in the claims.

In the accompanying drawings, which illustrate the invention, like characters indicate like parts throughout the several views.

Referring to the drawings,

Figure 1 is a view in vertical central section of a wheel equipped with a pneumatic tire and also illustrating, by means of broken and full lines, the improved caliper in two positions measuring the horizontal width of the tire at diametrically opposite points; and Fig. 2 is a horizontal section taken on the line 2—2 of Fig. 1.

Of the parts of the wheel illustrated, for the purpose of showing the use of the improved caliper, it is only necessary to note the felly 1, demountable rim 2 and pneumatic tire 3, only the casing of which is shown.

The improved pneumatic tire caliper comprises a pair of levers 4 and 5 pivotally connected at their intermediate portions by a thumb nut-equipped binding or pivot post 6. The lever 4 is relatively long and has an S-shape formation, while the lever 5 is relatively short and, as shown, is in the form of a flat reversed curve. The spacing of the coöperating opposite ends of the levers 4 and 5 varies an amount indicating the proper variation between normal and load-supported conditions of the tire 3. By the expression "load-supported," is meant that portion of the pneumatic tire which rests on the ground and is somewhat flattened, due to the load. The degree of flattening or distortion of the pneumatic tire depends on the inflation and on the load supported. The coöperating opposite ends of the levers 4 and 5 are indicated by the numerals 7 and 8.

To determine whether or not a pneumatic tire is properly inflated, the width of the tire, at a point diametrically opposite its ground-engaging portion, is first measured by the coöperating ends 7 of the levers 4 and 5, as shown by full lines in Fig. 1. This setting of the coöperating ends 7 of the caliper automatically sets the coöperating ends 8 to indicate the proper width of the tire at its ground-engaging or flattened portion. The caliper is then turned end for end and the width of the ground-engaging portion of the tire tested by the ends 8 of said caliper, as indicated by broken lines in Fig. 1. If the tire is properly inflated, the sides thereof will just touch the ends 8 of the caliper, or, if the same has a width greater than the distance between the ends 8, the indication is that the tire is not sufficiently inflated. On the other hand, if the width of the tire is less than the distance between the ends 8, the indication is that the tire is overinflated.

By the use of the improved caliper, a tire may be tested, from time to time, to determine whether or not the same is properly inflated. Or, in charging a tire, the caliper can be used to determine when sufficient air has been supplied thereto. As the levers 4 and 5 of the caliper do not have to be changed from the time the normal width of the tire is measured to the testing of the load-supported condition, hence, the chances of making an error are very slight. Furthermore, no readings have to be made and the caliper can be used when the light is very dim.

The above described invention, while extremely simple and of comparatively small cost to manufacture, has few parts to get out of order and it is extremely easy to manipulate.

What I claim is:—

1. A caliper comprising a pair of levers pivotally connected near their centers, one thereof being S-shaped and longer than the other.

2. A caliper comprising a pair of levers pivotally connected near their centers, one thereof being S-shaped and longer than the other, the opposite ends of one coöperating with the corresponding ends of the other to fix the limits of proportional dimensions, and the relation between the arms of the levers being such that when one pair of ends are set to correspond with the horizontal diameter of the free portion of a properly inflated tire on the wheel of an automobile the other pair will indicate the horizontal diameter of that portion of the tire in contact with the earth.

In testimony whereof I affix my signature in presence of two witnesses.

ALBERT O. RUNNING.

Witnesses:
  HENRY OLLOE,
  R. M. WHITAKER.